Aug. 30, 1938.    F. P. MILLER ET AL    2,128,572

TOOL HOLDER

Filed Nov. 9, 1936

Inventors
FRANK P. MILLER AND
EDWARD G. DORNHOFFER

By E. F. Salter
Attorney

Patented Aug. 30, 1938

2,128,572

UNITED STATES PATENT OFFICE 2,128,572

TOOL HOLDER

Frank P. Miller and Edward G. Dornhoffer, Meadville, Pa., assignors to McCrosky Tool Corporation, Meadville, Pa., a corporation of Pennsylvania Application November 9, 1936, Serial No. 109,984

5 Claims. (Cl. 29—48)

The present invention relates to improvements in tool holders or carriers and more particularly to turret tool holders for use on turning machines such as engine lathes, turret lathes or the like.

An important object of the present invention is the provision of a turret tool holder which has increased strength and rigidity, which is more certain and accurate in operation than the tool holders of the prior art and which is of simple and inexpensive construction.

Other objects and advantages of the invention will be apparent during the course of the following description.

Figure 1:
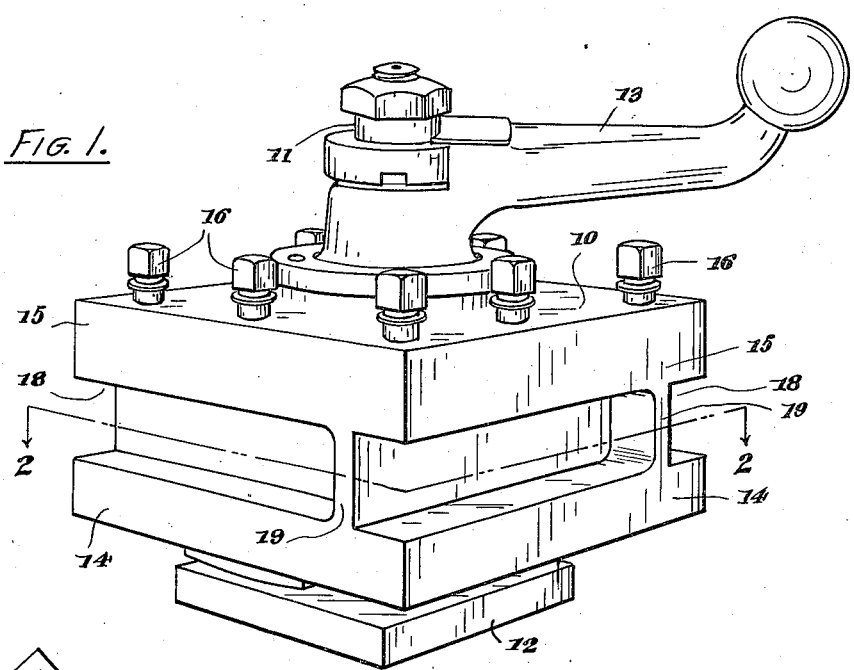
Figure 2:
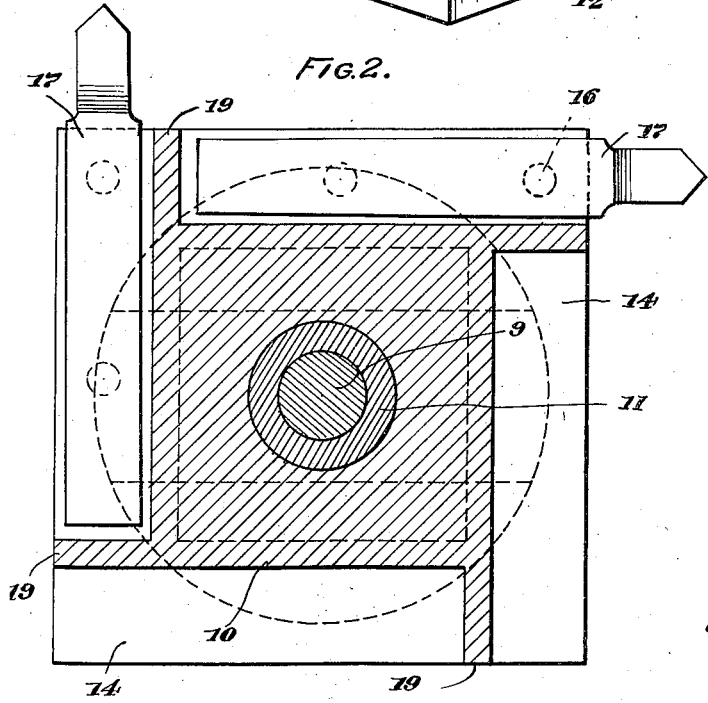

In the accompanying drawing, which forms a part of this specification and wherein like characters of reference denote like parts throughout, Figure 1 is a perspective view of a turret tool holder embodying the invention, and, Figure 2 is a horizontal sectional view on the line 2—2 of Figure 1.

In the drawing, wherein for the purpose of illustration is shown a preferred embodiment of the invention, the numeral 10 designates a tool carrier which is mounted upon and rotatable about a column 11 which in turn surrounds a central stem 9. A slide block 12 is carried by the lower end of stem 9 to engage the cross-slide or compound rest of the turning machine in the usual manner, and the movement and setting of the tool carrier 10 is accomplished by the operating handle 13 as is usual in this art. The tool carrier 10 is polygonal in shape and may have any desired number of sides, four being shown for the purpose of illustration.

The mechanism thus far described is of the usual construction and forms no part of the present invention. For this reason, details of the construction and operation of the tool carrier about the column 11 have not been illustrated.

Each side of the usual tool carrier or turret is recessed to provide upper and lower shelves between which the tools are arranged, and clamping screws project through the upper shelf to engage the tool and force it against the lower tool shelf with sufficient force to rigidly hold the tool in place against the strains incident to the turning or cutting operation. With modern turning machines and with modern cutting tools of high speed steel or other modern cutting metals, very heavy cuts and very high speeds are permissible. High speeds and deep cuts however place a tremendous downward strain upon the tool, and this downward strain is aggravated by the severe clamping force exerted by the tool clamping screws. The combination of these downward thrusts has a tendency to spring downwardly the lower tool shelf or ledge. The thickness of the lower tool shelf is definitely limited by the height of the lathe centers above the tool carriage, and for this reason the downward springing of the shelf cannot be overcome by a thickening of the shelf. It will be seen that any springing of the tool shelf, however slight, will result not only in weakening of the tool carrier but will also result in inaccuracy in the turret indexing mechanism, which to be efficient must index each tool in exact position.

To overcome this inherent weakness in the turret attachments of the prior art, the present invention contemplates a strengthening of the tool carrier in a simple and efficient manner. The tool carrier is provided with the usual lower tool shelf 14 and the upper clamping ledge 15. Clamping screws 16 extend through screw threaded openings in the clamping ledge and engage the tools 17 to force them against the tool shelf 14. The tools 17 are disposed in the recesses 18 between the shelves 14 and 15 and their cutting ends project laterally beyond the tool carrier to engage the work.

In order to strengthen the shelves 14 and 15 and to avoid the difficulties encountered in the turrets of the prior art, the inner wall of each tool recess 18 is extended on one side to the edges of the shelves, in the form of a web 19 forming a continuation of the inner wall of the recess and rigidly and integrally connecting the upper and lower shelves 14 and 15. It will be seen that the webs 19 are four in number and each web forms a continuation of the inner wall of one tool recess and the rear wall of the adjacent tool recess.

By integrally joining the shelves 14 and 15 the strength of both shelves is combined to resist the downward strain exerted upon the tool. The arrangement of the webs 19 is such as to join the shelves at each of their ends so that there will be no downward springing of the lower tool shelf 14 and no inaccuracies due to such downward springing of the shelf. The rigidity of the upper clamping screw carrying shelf is materially increased, and the ability of the tool carrier to withstand the downward cutting strain is doubled by this construction.

The operation of the tool carrier of the present invention is the same as formerly. The successive tools are securely clamped in recesses 18 by screws 16, and by manipulating the handle 13 the successive tools may be brought into cutting contact with the work in rapid succession so that the several machining operations can be performed rapidly, and without delays incident to changing and setting tools. The handle 13 releases the tool carrier, permits its rotation to the next operating position and clamps the carrier in its cutting position in the usual manner.

The carrier of the present invention is of simple construction and may be manufactured inexpensively. The webs 19 insure the preservation of the original position of the shelves, prevent springing of the shelves and improve the effectiveness of the tool carrier. The webs may obviously be used on carriers having any number of sides.

While we have shown and described the preferred embodiment of our invention, it is to be understood that various changes in the size, shape and arrangement of parts may be resorted to without departing from the spirit of our invention or the scope of the subjoined claims.

Having thus described our invention, what we claim and desire to protect by Letters Patent is:

1. A lathe turret comprising a solid unitary rotatable tool carrier, spaced upper and lower shelves integral therewith and forming tool recesses, clamping members carried by one of the shelves and adapted to force the tools against the other shelf, and webs integral with the carrier body and connecting the shelves and forming continuations of the inner wall of each recess to combine the strength of the two shelves to effectively resist the cutting and clamping strains placed upon the shelves.

2. A lathe turret comprising a solid unitary rotatable tool carrier, spaced upper and lower shelves integral therewith and forming tool receiving recesses, clamping members carried by one of the shelves and adapted to force the tools against the other shelf, the inner wall of each tool recess being integral with the carrier body and extended on one end to the outer edges of the shelves to provide a strengthening web connecting the upper and lower shelves and forming a continuation of the inner wall of one recess and a rear wall of the adjacent recess.

3. A lathe turret comprising a solid unitary rotatable tool carrier, spaced upper and lower shelves integral therewith and forming tool receiving recesses, clamping screws extending through the upper shelf and adapted to engage the tools and clamp them against the lower shelf, and reinforcing webs integrally connecting the upper and lower shelves and forming continuations of the inner wall of each tool recess to combine the strength and rigidity of both shelves in resisting the cutting and clamping strains, said webs being integral with the body of the carrier.

4. A lathe turret comprising a solid unitary rotatable tool carrier adapted to carry a series of tools for use in successive machining operations, upper and lower shelves integral therewith and forming a plurality of tool receiving recesses, clamping screws carried by the upper shelf and adapted to engage the tools and clamp them against the lower shelf, and reinforcing webs integrally connecting the upper and lower shelves and forming a continuation of the inner wall of each recess to the outer edges of the shelves while providing a rear wall to the adjacent tool recess, said webs being integral with the body of the carrier.

5. A lathe turret comprising a solid unitary polygonal body having a series of perimetrically disposed tool recesses each open throughout its entire outer side and outer end to the perimeter of the body and defining spaced upper and lower perimetric shelves, the inner end of each recess being closed by a transverse web integral with the body and integrally uniting the inner wall and the two shelves and extending flush with the inner wall of the immediately adjacent recess to the perimeter of the shelves, a plurality of tool clamping members carried by one of the shelves perimetrically of the body along each recess, and the outermost clamping member for each recess being in proximity to the web forming the inner end of the adjacent recess.

FRANK P. MILLER.
EDWARD G. DORNHOFFER.